United States Patent
Kreizman et al.

[11] Patent Number: 6,123,675
[45] Date of Patent: Sep. 26, 2000

[54] TEMPERATURE GRADIENT SENSING PROBE FOR MONITORING HYPERTHERMIC MEDICAL TREATMENTS

[75] Inventors: Alexander S. Kreizman, Beechurst; Kenneth F. Defrietas, Patterson, both of N.Y.

[73] Assignee: Trex Medical Corporation, Danbury, Conn.

[21] Appl. No.: 09/166,482

[22] Filed: Oct. 6, 1998

[51] Int. Cl.[7] .................................................. A61B 5/00
[52] U.S. Cl. ........................ 600/549; 600/555; 374/100; 374/112
[58] Field of Search ................................ 600/549, 555; 374/15, 100, 104, 112, 121, 142

[56] References Cited

U.S. PATENT DOCUMENTS

| | | | |
|---|---|---|---|
| 3,999,537 | 12/1976 | Noiles | 600/549 |
| 4,350,168 | 9/1982 | Chable et al. | 128/736 |
| 4,397,314 | 8/1983 | Vaguine | 128/399 |
| 4,538,464 | 9/1985 | Wheatley et al. | 73/646 |
| 4,588,307 | 5/1986 | Palti | 374/170 |
| 4,624,582 | 11/1986 | Banda et al. | 374/181 |
| 4,795,498 | 1/1989 | Germanton et al. | 136/225 |
| 4,935,345 | 6/1990 | Guilbeau et al. | 435/14 |
| 4,955,380 | 9/1990 | Edell | 600/549 |
| 4,960,109 | 10/1990 | Lele | 128/736 |
| 5,037,488 | 8/1991 | Wienand | 136/230 |
| 5,167,723 | 12/1992 | Tsukakoshi | 136/225 |
| 5,180,440 | 1/1993 | Siegel et al. | 136/230 |
| 5,207,227 | 5/1993 | Powers | 128/691 |
| 5,222,953 | 6/1993 | Dowlatshahi | 606/15 |
| 5,286,304 | 2/1994 | Macris et al. | 136/201 |
| 5,411,600 | 5/1995 | Rimai et al. | 136/225 |
| 5,417,686 | 5/1995 | Peterson et al. | 606/25 |
| 5,456,682 | 10/1995 | Edwards et al. | 606/31 |
| 5,474,619 | 12/1995 | Kreider | 136/239 |
| 5,573,004 | 11/1996 | Groenke | 600/549 |
| 5,596,995 | 1/1997 | Sherman et al. | 600/549 |
| 5,623,940 | 4/1997 | Daikuzono | 600/549 |
| 5,682,053 | 10/1997 | Wiszniewski | 257/401 |
| 5,689,087 | 11/1997 | Jack | 136/213 |
| 5,906,584 | 5/1999 | Pavoni et al. | 600/549 |

*Primary Examiner*—Cary O'Connor
*Assistant Examiner*—Charles Marmer
*Attorney, Agent, or Firm*—Ware, Fressola, Van Der Sluys & Adolphson LLP

[57] ABSTRACT

Several embodiments of a temperature gradient sensing probe formed from a printed circuit thermocouple array are disclosed. The printed circuit thermocouple array is formed by an electrically insulative sheet having a first surface, a second surface and N electrically conductive junctions passing through the sheet from the first surface to the second surface, wherein N is an integer greater than one. N electrically conductive paths formed from a first conductive material are applied to the first surface, wherein each of the N conductive paths formed from the first conductive material have a junction end electrically connected respectively to one of the N conductive junctions and a connector end for electrical connection to a signal transmission conduit. N electrically conductive paths formed from a second conductive material, dissimilar to the first electrically conductive material are also provided. The N conductive paths formed of the second material have a junction end electrically connected to one of the N conductive junctions and a connector end for electrical connection to a signal transmission conduit. The array may be applied to a shaft or disposed within a tube to form the probe. The N conductive paths formed of a second material may be replaced by a single, common conductive path formed of the second material which is connected to the conductive junctions. A panel connector for the probe is also disclosed.

37 Claims, 11 Drawing Sheets

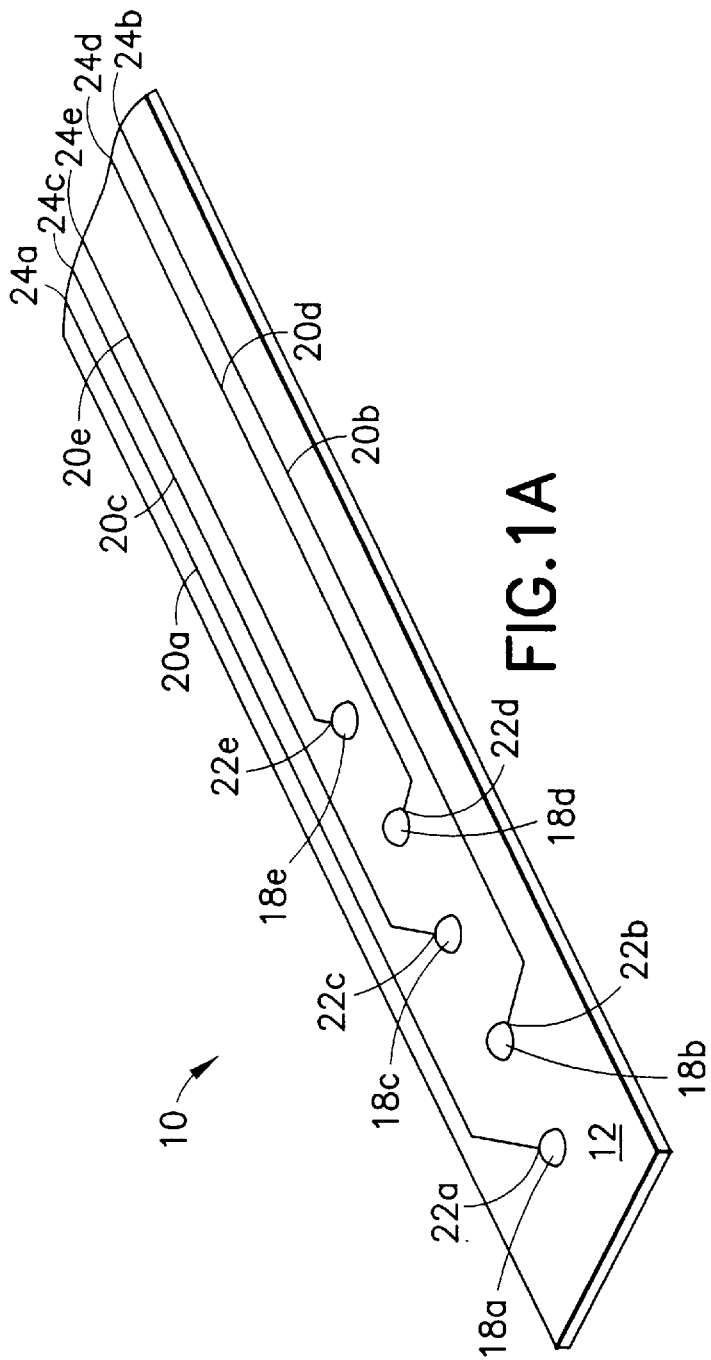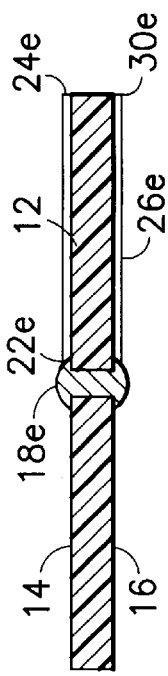

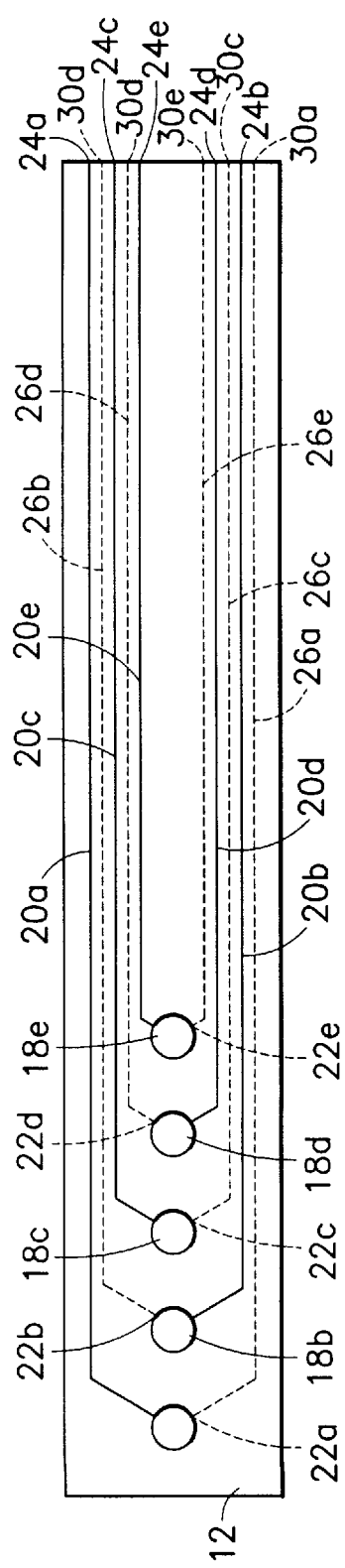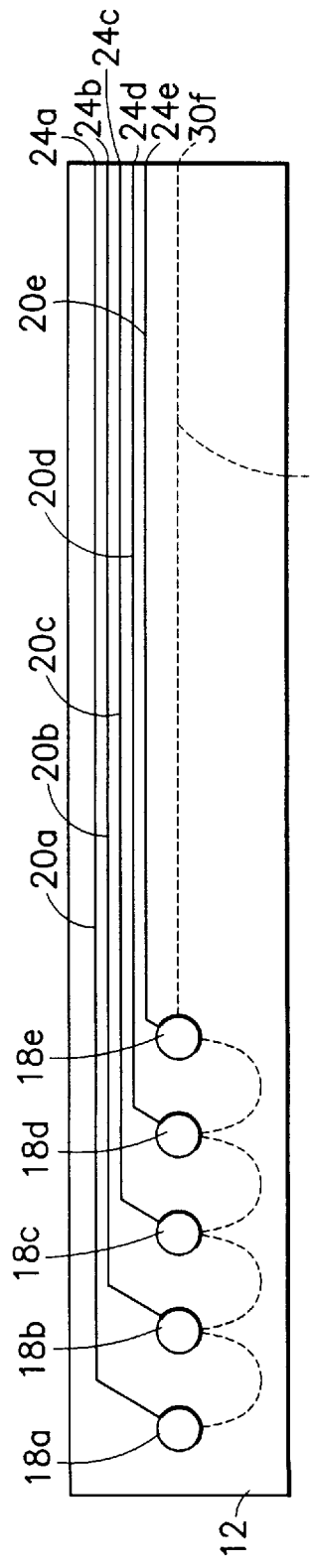

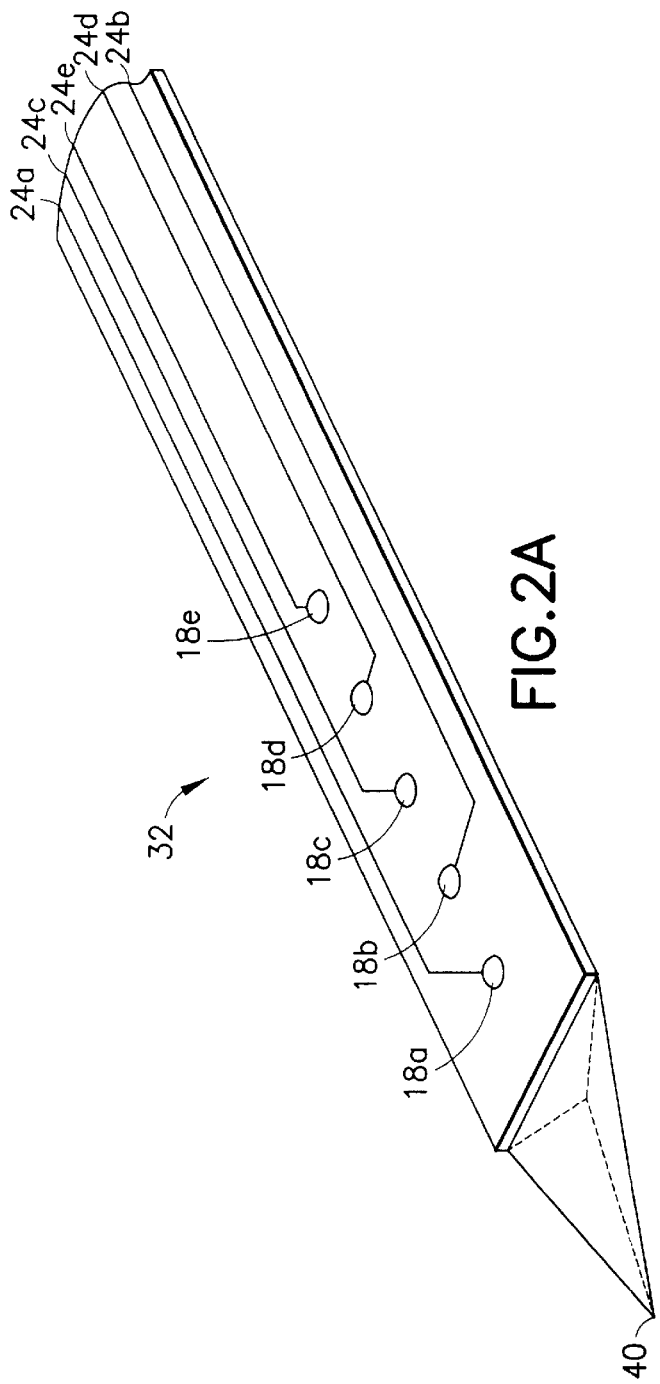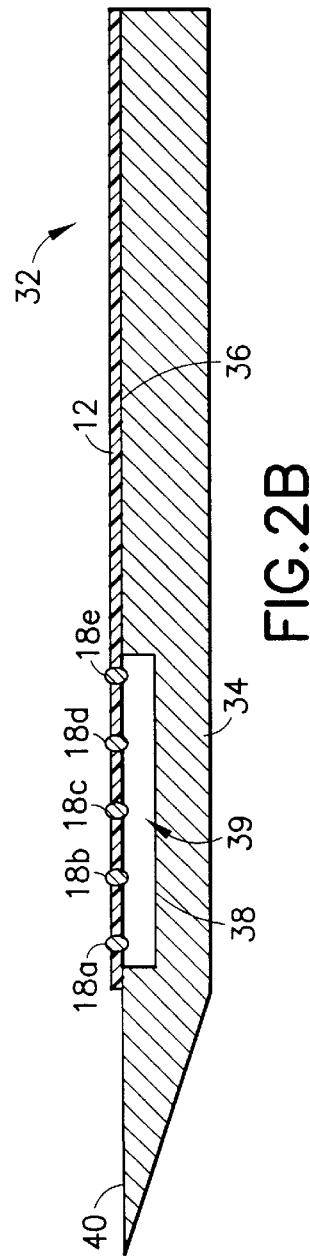
FIG.2A
FIG.2B

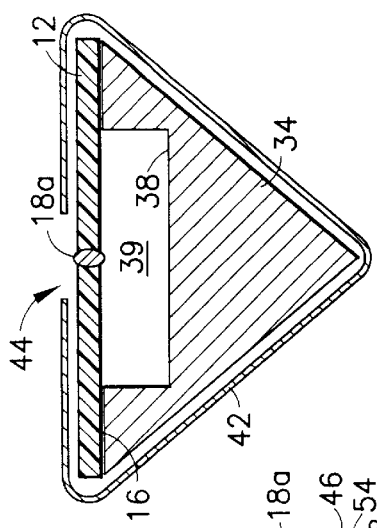
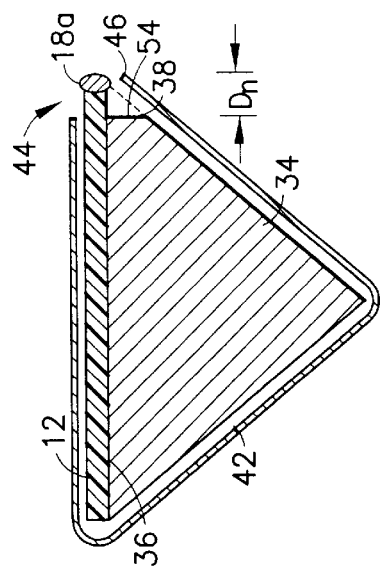
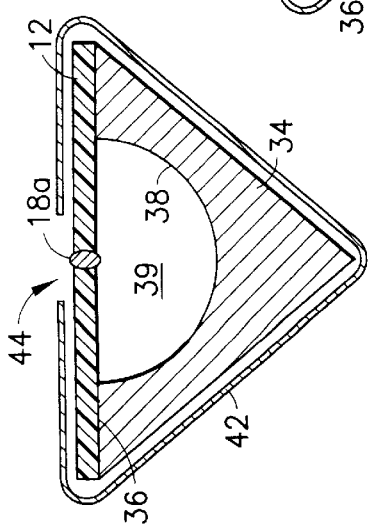
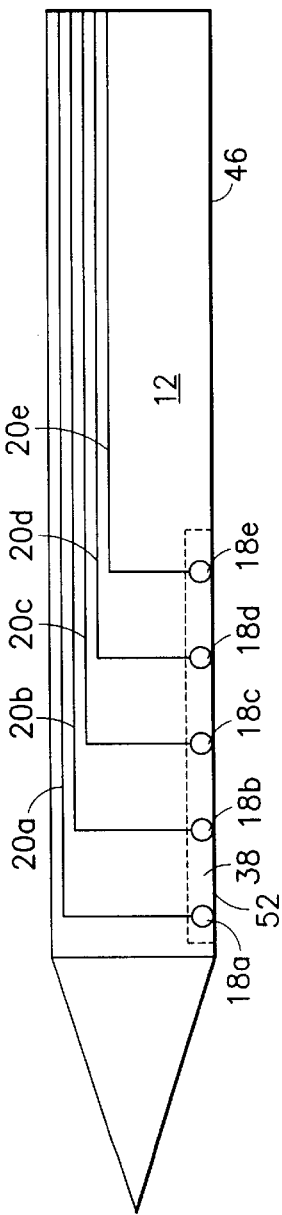

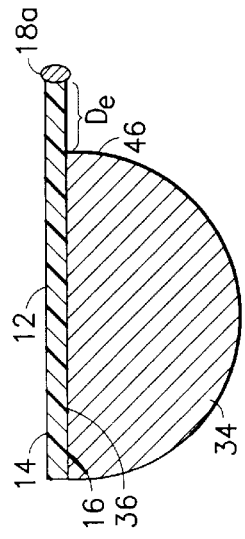
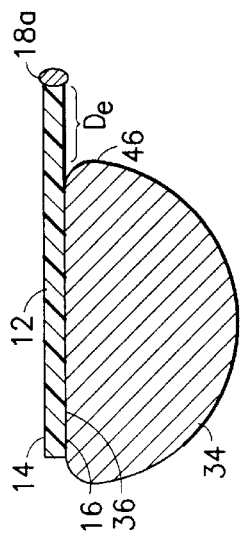
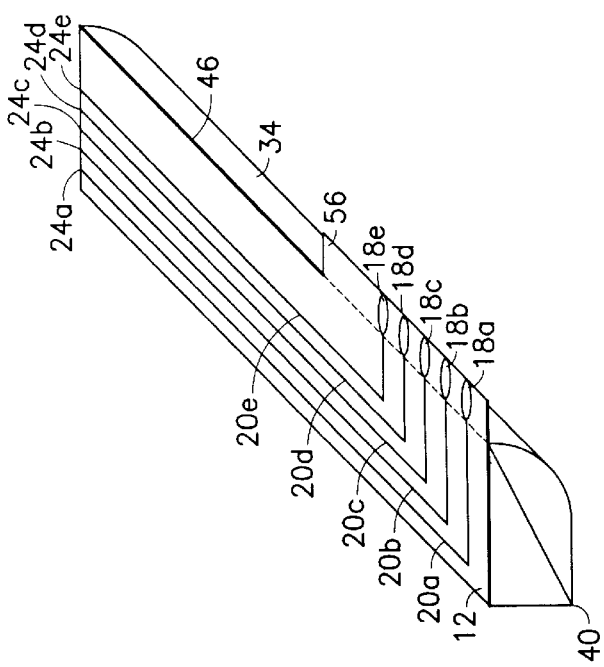
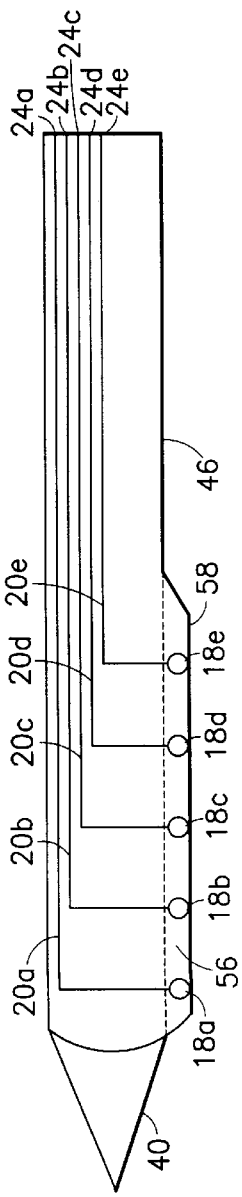

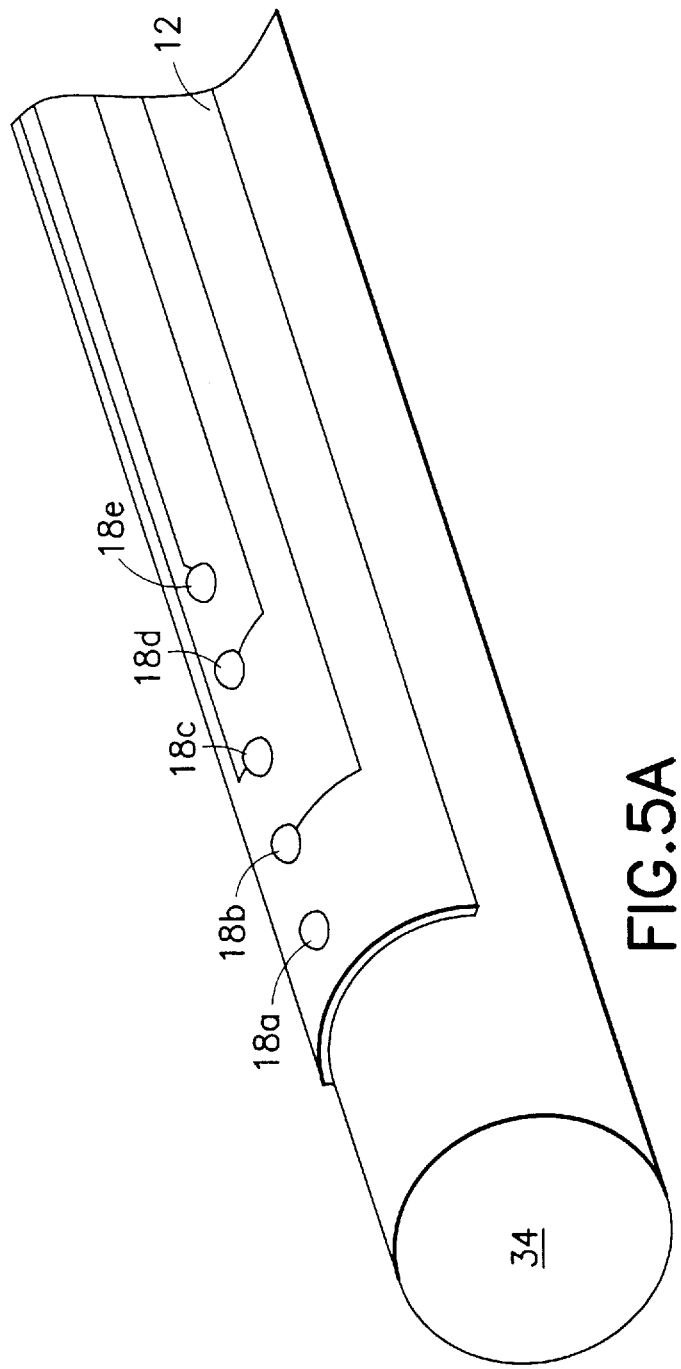
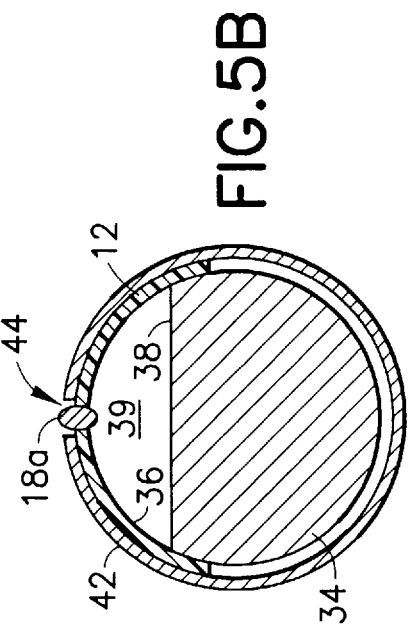
FIG.5A
FIG.5B

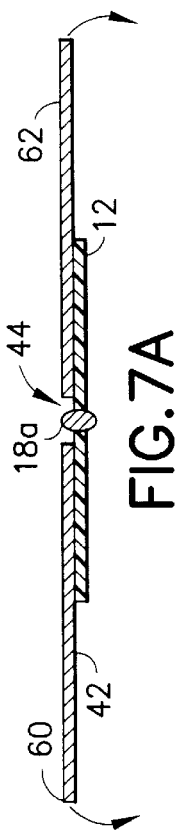
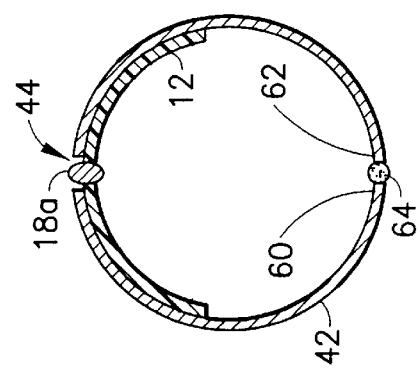
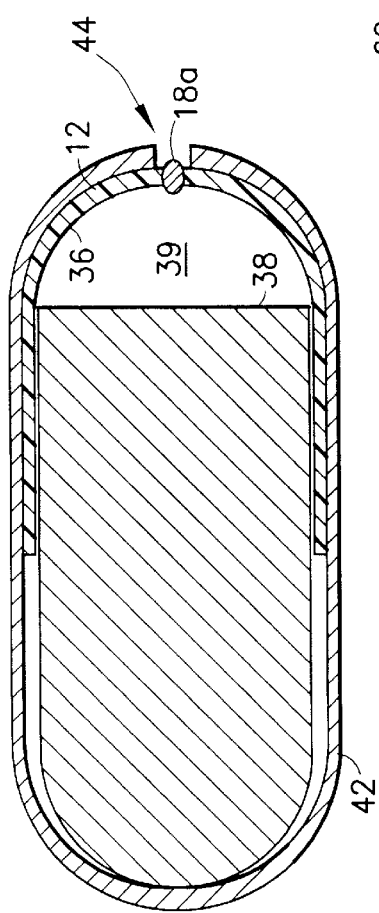
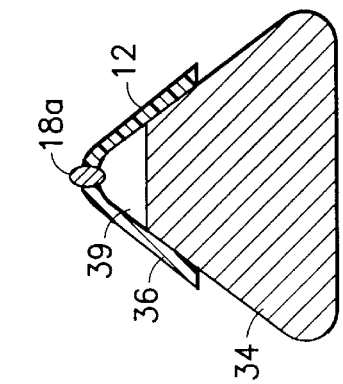

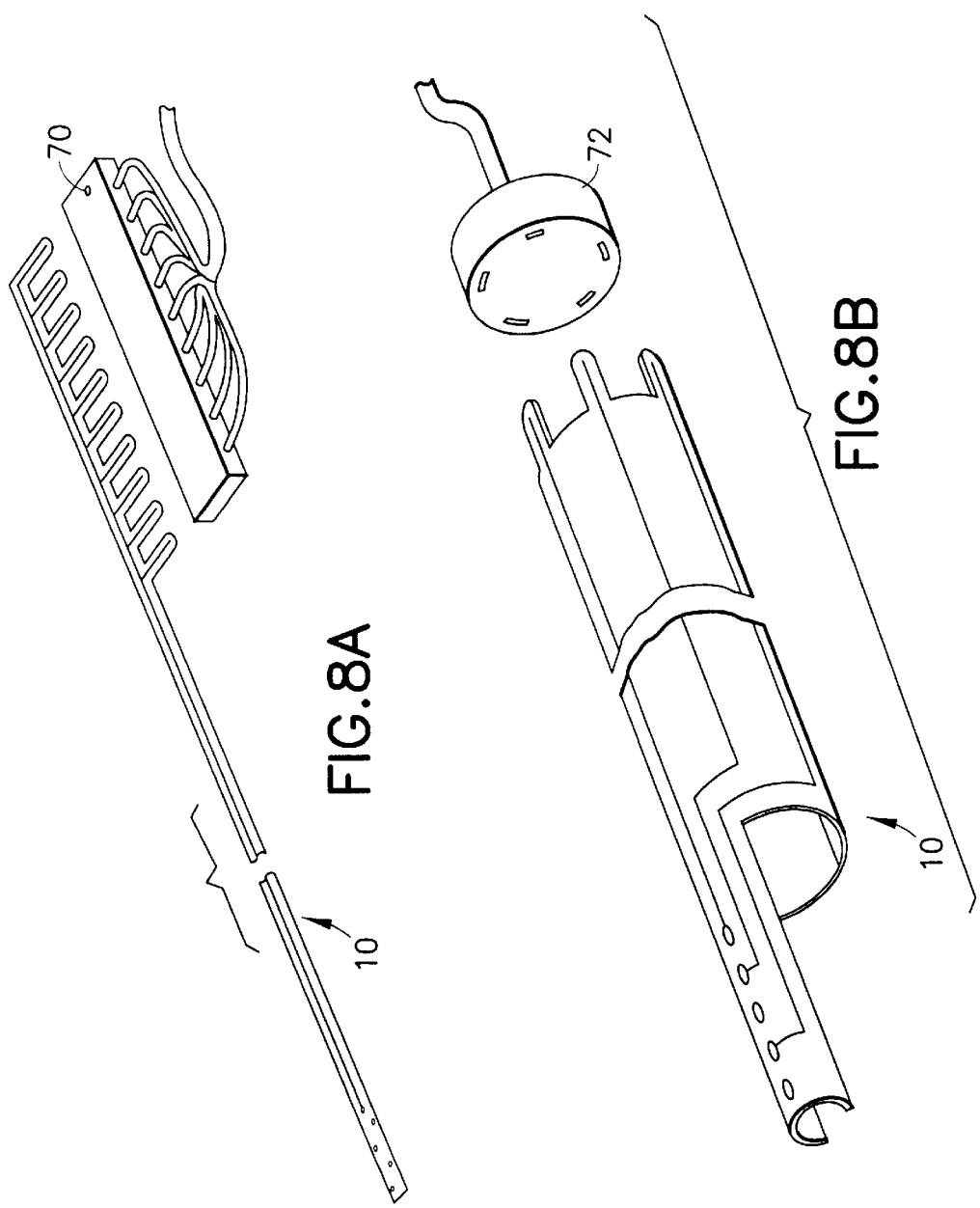

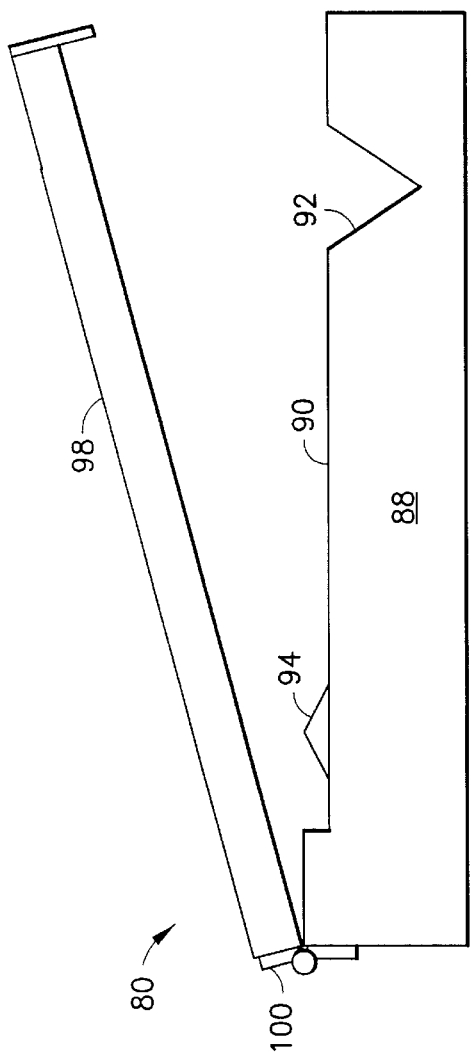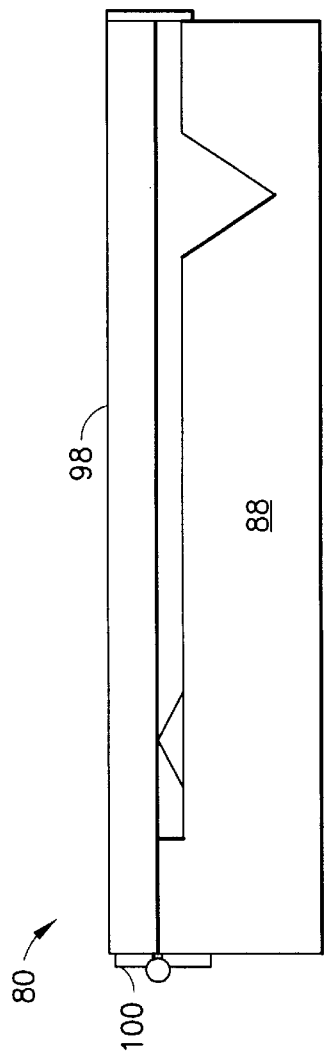
FIG.10A
FIG.10B

TEMPERATURE GRADIENT SENSING PROBE FOR MONITORING HYPERTHERMIC MEDICAL TREATMENTS

BACKGROUND OF THE INVENTION

1. Field of the Invention

The present invention generally relates to temperature sensing probes. More particularly, the present invention relates to a temperature gradient sensing probe for monitoring hyperthermic medical treatment of tissue.

2. Description of the Prior Art

According to U.S. Pat. No. 4,397,314, hyperthermia is defined as the heating of living tissue for therapeutic purposes. The high heat contributes to the natural regression or remission of tumors. Generally, in hyperthermic medical treatments, a controllable temperature level elevation at preselected locations and volumes of tissue is utilized to treat patients with cancer or other diseases.

According to U.S. Pat. No. 4,960,109, satisfactory hyperthermic treatment requires the ability to produce specific, well-characterized temperature elevations in precisely selected volumes of tissue that comprise the malignancy. This, in turn, requires the capability of measuring and controlling the temporal and spatial characteristics of an absorbed thermal dose so as to produce the desired temperature distribution for the specific malignancy being treated.

In U.S. Pat. No. 4,397,314, a linear array temperature probe is disclosed. The disclosed probe is comprised of a number of sensors which are ensheathed in a protective plastic catheter. The sensors are connected to a circuit via pairs of optic fiber cables. One of the fiber optic cables transmits monochromatic radiant energy to a gallium arsenide temperature sensor. Another fiber optic cable transmits a reflected ray, the intensity of which is a function of the temperature of the semiconductor sensor.

Due to the delicate nature of optical fibers, the described temperature probe is believed to be relatively expensive to manufacture because very careful handling is required. Because such probes are believed to be expensive as a result of the delicate nature of the optical fiber, it is likely that such probe will not be discarded after use, but instead, carefully handled and placed in an autoclave to be sterilized. Such additional after treatment handling further adds to the cost of using such probes. Thus, the costs of manufacturing and use of the described probe are believed to be relatively high, and potentially prohibitive.

In U.S. Pat. No. 4,960,109, a multi-function probe or needle for use in hyperthermia therapy is disclosed. The probe employs at least one pair of temperature sensors which may be thermocouples or thermistors. These sensors are connected to a measuring circuit via small conductive leads. The handling, strain relief, termination of small wires is difficult, expensive and not very reliable. Thus, because such probes tend to be very small so as to be minimally invasive when inserted into a patient, the manufacturing costs of affixing the sensors to the probe and the threading of leads in the probe are likely to be very high, making such probes expensive to purchase. As discussed above, these probes are also not likely to be discarded, but reused after sterilization procedures are performed, further adding to the cost of using such probes.

It is desirable to provide a hyperthermic temperature gradient sensing probe which is relatively inexpensive to manufacture. It is also desirable to provide a probe that is inexpensive to use, accurate and that may be discarded after use to reduce the cost of after treatment handling.

SUMMARY OF THE INVENTION

It is an object of the present invention to provide a temperature gradient sensing probe for use in a hyperthermic treatment process.

It is another object of the present invention to provide a relatively inexpensive temperature gradient sensing probe for use in a hyperthermic treatment process which is relatively easy to manufacture.

These objects are accomplished, at least in part, by providing a temperature gradient sensing probe for insertion into tissue undergoing a hyperthermic treatment process and for measuring a temperature gradient in tissue adjacent to the probe. In one basic embodiment of the invention, the probe comprises a shaft having a supporting surface. A printed circuit thermocouple array is attached to the supporting surface of the shaft. The printed circuit thermocouple array is formed by an electrically insulative sheet having a first surface, a second surface and N electrically conductive junctions passing through the sheet from the first surface to the second surface, wherein N is an integer greater than one. N electrically conductive paths formed from a first conductive material are applied to the first surface, wherein each of the N conductive paths formed from the first conductive material have a junction end electrically connected respectively to one of the N conductive junctions and a connector end for electrical connection to a signal transmission conduit. N electrically conductive paths formed from a second conductive material, dissimilar to the first electrically conductive material are also provided. The N conductive paths formed of the second material have a junction end electrically connected to one of the N conductive junctions and a connector end for electrical connection to a signal transmission conduit.

In another basic embodiment, the probe comprises the same shaft and printed circuit thermocouple array. However, instead of having N electrically conductive paths formed from a second conductive material connected to the N conductive junctions, this basic embodiment has a common electrically conductive path formed from a second conductive material, dissimilar to the first electrically conductive material. The common conductive path is connected to each of the N electrically conductive junctions. The common electrically conductive path has a connector end for electrical connection to a signal transmission conduit.

BRIEF DESCRIPTION OF THE DRAWINGS

The drawings, not drawn to scale, include:

FIG. 1A is a perspective view of a printed circuit thermocouple array containing five conductive junctions that may be used in the present invention;

FIG. 1B is a plan view of the printed circuit thermocouple array illustrating the conductive paths formed of two dissimilar materials;

FIG. 1C is a partial cross-sectional view of the printed circuit thermocouple array taken at one of the conductive junctions;

FIGS. 1D and 1E are plan views of alternative printed circuit thermocouple arrays that may be used in the present invention;

FIG. 2A is a perspective view of a first general embodiment of the temperature gradient sensing probe of the present invention which is useful for measuring temperature gradients in tissue undergoing a hyperthermic treatment;

FIG. 2B is a longitudinal cross-sectional view of the temperature gradient sensing probe illustrated in FIG. 2A;

FIG. 2C is a transverse cross-sectional view of the temperature gradient sensing probe illustrated in FIG. 2A;

FIG. 2D is a transverse cross-sectional view of an alternative notch configuration for the embodiment of FIG. 2A;

FIG. 3A is a perspective view of second general embodiment of the temperature gradient sensing probe;

FIG. 3B is a transverse cross-sectional view of the embodiment illustrated in FIG. 3A;

FIG. 4A is a perspective view of a third general embodiment of the present invention;

FIG. 4B is a transverse cross-sectional view of the third general embodiment illustrated in FIG. 4A;

FIG. 4C is a transverse cross-sectional view of the third general embodiment, illustrating a modification to the support shaft;

FIG. 4D is a plan view of the third general embodiment of the present invention;

FIGS. 5A is a perspective view of another embodiment of the probe;

FIG. 5B is a transverse cross-sectional view of the embodiment illustrated in FIG. 5A;

FIGS. 6A and 6B are transverse cross-sectional views of alternative cross-sections for the shaft;

FIG. 7A is a cross-sectional view of an embodiment of the probe prior to final assembly;

FIG. 7B is a cross-sectional view of a probe having the printed circuit thermocouple disposed in a tube;

FIGS. 8A and 8B are perspective views of alternative connectors for connecting the probe to a monitoring circuit;

FIGS. 10A and 10B are elevation end views of the panel connector showing the connector open and closed.

DETAILED DESCRIPTION OF THE INVENTION

Figure 1E:
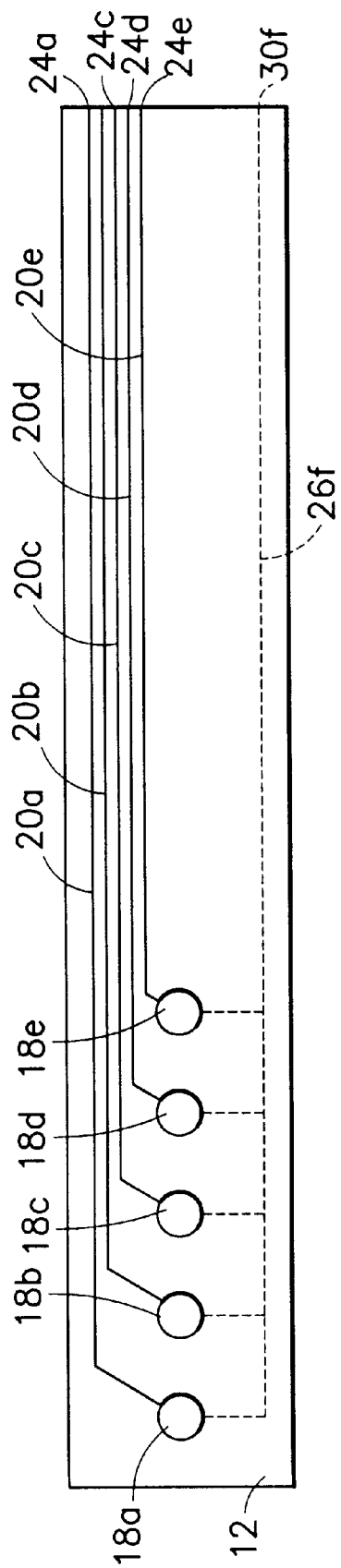

Referring to FIGS. 1A through 1C, the cross-sectional illustration of FIG. 1B, a printed circuit thermocouple array 10 is shown. The thermocouple array 10 comprises an electrically insulative sheet 12, which may either be made from a rigid or flexible material, having a first surface 14 and a second surface 16. In the illustrative embodiment shown in the FIGS., the insulative sheet has five electrically conductive junctions 18a–18e that pass through it from the first surface 14 to the second surface 16. Five electrically conductive paths 20a–20e formed from a first conductive material, such as Copper, are applied to the first surface 14 according to typical printed circuit manufacturing methods. Each of the conductive paths 20a–20e has a junction end 22a–22e which is electrically connected to the five conductive junctions 18a–18e and a connector end 24a–24e for connection to a signal transmission conduit, such as a connector (not shown). The second surface 16 of the electrically insulative sheet 12 has a similar arrangement of five conductive paths 26a–26e made from a second electrically conductive material which is dissimilar from the first electrically conductive material on the first surface 14, such as Constantan. Referring to FIGS. 1D, a modified printed circuit array can be used in the present invention. In the modified array, instead of having five electrically conductive paths 26a–26e formed from the second electrically conductive material connected to the five conductive junctions 18a–18e, this modified array has a common electrically conductive path 26f formed from the second electrically conductive material which is dissimilar to the first electrically conductive material. The common conductive path 26f is connected to each of the five electrically conductive junctions 18a–18e, either in series, in parallel, or a combination of both. The common electrically conductive path has a connector end 30f for electrical connection to a signal transmission conduit. Alternatively, the second electrically conductive material may be in the form of a common wire which is connected as described above. When a common electrically conductive path is used, the length of the conductor between each conductive junction should be maximized to provide sufficient thermal resistance to reduce or eliminate thermal cross-talk between conductive junctions.

Referring to the embodiment illustrated in FIGS. 2A through 2D, a temperature gradient sensing probe 32 may be made by applying the printed circuit thermocouple array to a support shaft 34 such that the array resides on a supporting surface 36 of the shaft 34. The support shaft may be rigid, or semi-rigid or flexible depending on the end use application. In the embodiment illustrated, at least a portion of the supporting surface 36 is substantially flat. Those skilled in the art will appreciate that the shaft may be formed to have any cross-sectional shape desired including the triangular shape illustrated. The triangular shape and the semi-circular shapes illustrated herein are particularly advantageous in that such shapes allow an operator to easily orient the shaft in a manner to shade the thermocouple array from Laser radiation provided during a hyperthermic treatment. Of course, those skilled in the art will also appreciate that the circularly shaped shaft may be provided with indicia aligned with the conductive junctions of the thermocouple array that assist with optimal oriention of the shaft to shade the thermocouple array from the Laser radiation. However, it is believed that the flat surfaces on the triangular and semi-circular shaped shafts may provide better shading than the circularly shaped shaft.

If desired, the supporting surface 36 of the shaft 34 may be provided with a notched section 38. Those skilled in the art will appreciate that the notched section may be formed with any cross-sectional shape desired including semi-circular, rectangular or triangular, for example, as illustrated in FIGS. 2C and 2D. Alternatively, the shaft may be formed from an extruded metal or plastic material that includes a continuous notched section 38 in its cross-section that extends along its length.

In this embodiment, the five conductive junctions 18a–18e of the printed circuit thermocouple array are positioned inboard of the edges of the insulative sheet but so as to be adjacent to the notched section 38 laying underneath. If the shaft is not formed from an extruded metal or plastic material having a continuous notched section as part of the extrusion, the notched section 38 is made in the supporting surface 36 of the shaft 34 so as to span a length at least equal to the distance between the first and last of the five conductive junctions 18a–18e. The notched section 38 provides a void space region 39 wherein thermal conductivity or cross-talk between the conductive junctions is minimized. The shaft 34 may be provided with a pointed end 40 if desired to assist with the guidance of the probe 31 and array of thermocouples to a target region of tissue.

Still referring to FIGS. 2A through 2D, the printed circuit thermocouple array 10 can be attached to the shaft 34 by an adhesive applied between the second surface 16 of the insulative sheet 12 and the supporting surface 36 of the shaft. Alternatively, the printed circuit thermocouple array 10 and the shaft 34 can be held together by surrounding at least a portion of the combination by a tube 42 (not shown in FIGS. 2A and 2B). The tube 42 may be formed from a substantially rigid material, such as metal, an elastic material, such as rubber, or a heat shrinkable material. When the tube 42 is formed from either an elastic material or a heat shrinkable material, the tube 42 is or can be substantially conformal to the portion of the printed circuit thermocouple array 10 and shaft 34 that it surrounds. If desired, the tube may be provided with an opening 44 positioned adjacent to the conductive junctions 18a–18e to allow the conductive junctions to be directly exposed to tissue. Alternatively, the tube may be provided with a plurality of openings, each adjacent to one of the conductive junctions 18a–18e, respectively.

Referring to the embodiment illustrated in FIGS. 3A and 3B, the notched section 38 can be provided in one longitudinal edge 46 rather than in a flat or substantially continuous surface of the shaft 34. When a shaft of this configuration is used, the printed circuit thermocouple array 10 should be fabricated so that the conductive junctions 18a–18e are adjacent to one of the edges 52 of the insulative sheet 12 and the printed circuit thermocouple array should be applied to the shaft such that the five conductive junctions 18a–18e on the printed circuit are held in a cantilever fashion from a longitudinal edge 54 of the notched section 38 by a distance $D_n$. Also, the notched section 38 preferably spans a length at least equal to the distance between the first and last of the five conductive junctions 18a–18e. As described above, the notched section 38 in the longitudinal edge 46 of the shaft reduces thermal conductivity between conductive junctions 18a–18e.

The printed circuit thermocouple array of the probe illustrated in FIGS. 3A and 3B may be affixed to the supporting surface 36 of the shaft 34 as described above. Also, as described above with respect to the embodiment of FIGS. 2A through 2D, at least a portion of the printed circuit thermocouple array 10 and the shaft 34 may be surrounded by the tube 42 and the tube 42 may be provided with an opening 44 positioned adjacent to the conductive junctions 18a–18e to allow the conductive junctions to be directly exposed to tissue. Alternatively, the tube 42 may be provided with a plurality of openings, each adjacent to one of the conductive junctions 18a–18e, respectively.

In the embodiment illustrated in FIGS. 4A through 4C, the shaft 34 includes at least one longitudinal edge 46. The insulative sheet 12 is provided with a tab section 56. The N conductive junctions 18a–18e are positioned adjacent to an outward edge 58 of the tab section 56. The insulative sheet 12 is supported on the supporting surface 36 of the shaft so that the conductive junctions 18a–18e on the tab section are held in a cantilever fashion outboard from the longitudinal edge 46 of the shaft by a distance $D_e$. As illustrated in FIG. 4C, the longitudinal edge 46 may be rounded, if desired.

When the insulative sheet of the printed circuit thermocouple array is made from a flexible material, such as Mylar™ or Kapton™ for example, it can be conformingly applied to at least a portion of the supporting surface 36 of the shaft 34 that is rounded. For example, referring to FIGS. 5A and 5B, the shaft 34 can be made to have a circular cross section and the array 12 can be wrapped over its supporting surface 36. Referring to FIG. 5B, the shaft 34 can be provided with the notched section 38 and a tube 42 may be fitted over the shaft 34 and array 12 as described above. The tube 42 may be provided with one or more openings 44 to permit direct exposure of the conductive junctions 18a–18e to the tissue being monitored, if desired.

As illustrated in FIGS. 6A and 6B, alternatively, the shaft 34 may be provided with an oval cross-section or a triangular cross-section with rounded corners. Those skilled in the art will appreciate that the cross-sectional configurations of the shafts are intended to be illustrative and not limiting. When the insulative sheet 12 of the printed circuit thermocouple array is made from a flexible material, the array can be made to substantially conform to the surface contours of the shaft 34. Referring to FIG. 7A and 7B, in an alternative embodiment of the probe, the first side 14 of the flexible insulative sheet 12 may be applied to a flexible support sheet 41 which is rolled into tube 42 thereby disposing the printed circuit thermocouple array in the tube 42. As shown in FIG. 7B, in this configuration, the flexible insulative sheet 12 forming the printed circuit thermocouple array is conformingly applied to the inside surface 43 of the tube. Ends 60, 62 of the flexible sheet may be held together by an adhesive 64, an ultrasonic weld, or by other joining mechanisms. The tube 42 may be provided with openings 44 between its inside surface 43 and its outside surface 45 as described above, if desired. In this embodiment, no shaft is used to support the printed circuit thermocouple array.

FIG. 8A illustrates a typical linear printed circuit edge connector 70 that can be used to connect the printed circuit thermocouple array 10, in a flat configuration, to a monitoring circuit. Alternatively, FIG. 8B illustrates a circular shaped printed circuit edge connector 72 that may be used to connect the flexible printed circular thermocouple array 10, in a curved configuration, to a monitoring circuit. The circularly shaped edge connector helps to maintain the flexible printed circuit thermocouple array's curved configuration.

Figure 9:
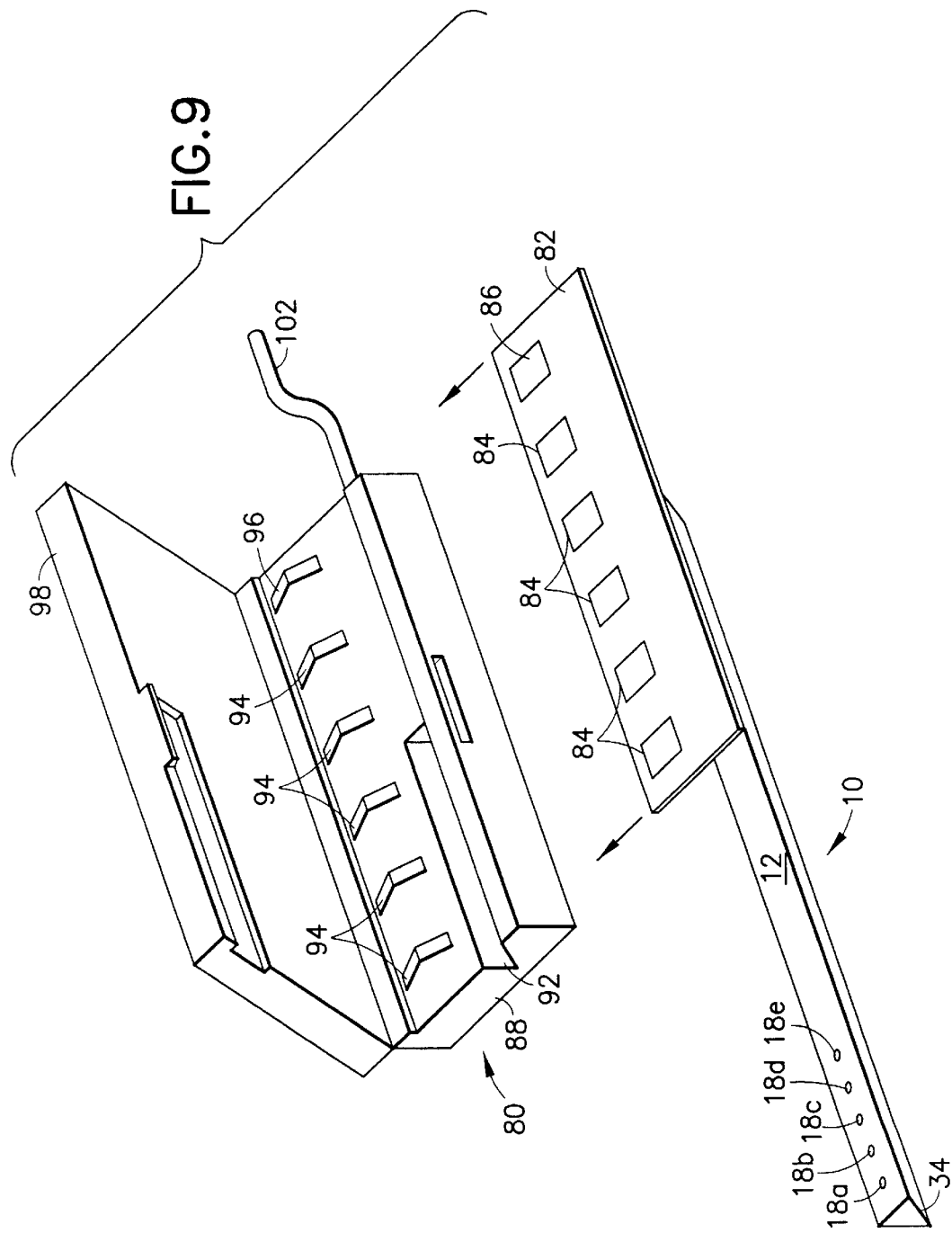
FIG. 9 is a perspective view of a panel connector for connecting a probe having a panel edge connector to a monitoring circuit.

As illustrated in FIGS. 9, 10A and 10B, a panel connector 80 may be used for securely connecting a panel shaped edge connector 82 containing a plurality of contacts 84 of a first conductive material and at least one contact of a second conductive material 86. The panel connector 80 includes a base 88 having top side 90 containing a support shaft receiving channel 92. The top side 90 is further provided with a plurality of resilient electrical contacts 94 formed from a first conductive material for engagement with the plurality of contacts 84 in the panel shaped edge connector 82. The top side 90 is also provided with at least one resilient electrical contact 96 formed from a second conductive material which is dissimilar from the first conductive material. This resilient contact 96 is intended to be engaged with the contact 86 on the probe. A cover is hingibly attached to the base 88 by hinge 100 and enables the panel shaped edge connector 82 to be securely clamped in the connector 80. The support shaft receiving channel 92 ensures alignment of the contacts 84, 86, 94, and 96. A cable 102 containing a plurality of conductors is provided to connect the panel connector to a monitoring circuit.

It will thus be seen that the objects and advantages set forth above and those made apparent from the preceding descriptions, are efficiently attained and, since certain changes may be made in the above construction without departing from the scope of the invention, it is intended that the matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. A temperature gradient sensing probe for insertion into tissue undergoing a hyperthermic treatment process and for measuring a temperature gradient in said tissue, the temperature gradient sensing probe comprising:

a shaft having a supporting surface; and a printed circuit thermocouple array residing on the supporting surface of the shaft, the printed circuit thermocouple array being formed by an electrically insulative sheet having:

a first surface, a second surface and N electrically conductive junctions passing through the sheet from the first surface to the second surface, wherein N is an integer greater than one, N electrically conductive paths formed from a first conductive material applied to the first surface, wherein each of the N conductive paths formed from the first conductive material have a junction end electrically connected respectively to one of the N conductive junctions and a connector end for electrical connection to a signal transmission conduit, and N electrically conductive paths formed from a second conductive material, dissimilar to the first electrically conductive material, applied to the second surface, wherein each of the N conductive paths formed from the second electrically conductive material has a junction end electrically connected to one of the N conductive junctions and a connector end for electrical connection to a signal transmission conduit.

2. The probe as defined in claim 1, wherein the supporting surface of the shaft further includes a notched section, and wherein the N conductive junctions of the printed circuit thermocouple array are positioned adjacent to the notch, and wherein the notch spans a length at least equal to the distance between the first and last of the N conductive junctions.

3. The probe as defined in claim 1, wherein at least a portion of the supporting surface of the shaft is substantially flat, and wherein at least a portion of the printed circuit thermocouple array resides on the flat portion of the shaft.

4. The probe as defined in claim 3, wherein the flat portion includes a notched section, wherein the N conductive junctions on the printed circuit thermocouple array are positioned adjacent to the notched section, and wherein the notched section spans a length at least equal to the distance between the first and last of the N conductive junctions.

5. The probe as defined in claim 1, wherein at least a portion of the supporting surface of the shaft is rounded, wherein the insulative sheet of printed circuit thermocouple array is formed from a flexible material, and wherein at least a portion of the printed circuit thermocouple array resides on the rounded portion.

6. The probe as defined in claim 5, wherein the rounded portion includes a notched section, wherein the N conductive junctions on the printed circuit thermocouple array are positioned adjacent to the notched section, and wherein the notched section spans a length at least equal to the distance between the first and last of the N conductive junctions.

7. The probe as defined in claim 1, wherein the N conductive junctions are positioned adjacent to an outward edge of the insulative sheet, wherein the shaft includes at least one longitudinal edge, and wherein the insulative sheet is supported by the supporting surface of the shaft such that the N conductive junctions are held in a cantilever fashion outboard from the longitudinal edge of the shaft.

8. The probe as defined in claim 7, wherein the longitudinal edge of the shaft is provided with a notch, wherein the printed circuit thermocouple array and the N conductive junctions thereon are held in a cantilever fashion from a longitudinal edge of the notch, and wherein the notched section spans a length at least equal to the distance between the first and last of the N conductive junctions.

9. The probe as defined in claim 1, wherein the printed circuit thermocouple array is attached to the shaft by an adhesive applied between the second surface of the insulative sheet and the supporting surface of the shaft.

10. The probe as defined in claim 1, wherein at least a portion of the printed circuit thermocouple array and shaft is surrounded by a tube.

11. The probe as defined in claim 10, wherein the tube is formed from a substantially rigid material.

12. The probe as defined in claim 10, wherein the tube is formed from an elastic material.

13. The probe as defined in claim 10, wherein the tube is formed from a heat shrinkable material and wherein the tube is shrunk over the portion of the printed circuit thermocouple array and shaft so as to be substantially conformal thereto.

14. The probe as defined in claim 10, wherein the tube includes an opening therein and wherein the opening is positioned adjacent to the N conductive junctions.

15. The probe as defined in claim 10, wherein the tube includes N openings, and wherein each of the N openings is positioned adjacent to one of the N conductive junctions.

16. The probe as defined in claim 1, wherein the shaft includes at least one longitudinal edge, wherein the insulative sheet is provided with a tab section, wherein the N conductive junctions are positioned adjacent to an outward edge of the tab section, and wherein the insulative sheet is supported on the supporting surface of the shaft so that the N conductive junctions on the tab section are held in a cantilever fashion outboard from the longitudinal edge of the shaft.

17. A temperature gradient sensing probe for insertion into tissue undergoing a hyperthermic treatment process and for measuring a temperature gradient in said tissue, the temperature gradient sensing probe comprising:

a shaft having a supporting surface; and a printed circuit thermocouple array residing on the supporting surface of the shaft, the printed circuit thermocouple array being formed by an electrically insulative sheet having:

a first surface, a second surface and N electrically conductive junctions passing through the sheet from the first surface to the second surface, wherein N is an integer greater than one, N electrically conductive paths formed from a first conductive material applied to the first surface, wherein each of the N conductive paths formed from the first conductive material have a junction end electrically connected respectively to one of the N conductive junctions and a connector end for electrical connection to a signal transmission conduit, and a common electrically conductive path formed from a second conductive material which is dissimilar to the first conductive material, wherein the common electrically conductive path is connected to each of the N conductive junctions and wherein the common path has a connector end for electrical connection to a signal transmission conduit.

18. The probe as defined in claim 17, wherein the length of the common conductive path is maximized between each conductive junction.

19. The probe as defined in claim 17, wherein the supporting surface of the shaft further includes a notched section, and wherein the N conductive junctions of the printed circuit thermocouple array are positioned adjacent to the notch, and wherein the notch spans a length at least equal to the distance between the first and last of the N conductive junctions.

20. The probe as defined in claim 17, wherein at least a portion of the supporting surface of the shaft is substantially flat, and wherein at least a portion of the printed circuit thermocouple array resides on the flat portion of the shaft.

21. The probe as defined in claim 20, wherein the flat portion includes a notched section, wherein the N conductive junctions on the printed circuit thermocouple array are positioned adjacent to the notched section, and wherein the notched section spans a length at least equal to the distance between the first and last of the N conductive junctions.

22. The probe as defined in claim 17, wherein at least a portion of the supporting surface of the shaft is rounded, wherein the insulative sheet of printed circuit thermocouple array is formed from a flexible material, and wherein at least a portion of the printed circuit thermocouple array resides on the rounded portion.

23. The probe as defined in claim 22, wherein the rounded portion includes a notched section, wherein the N conductive junctions on the printed circuit thermocouple array are positioned adjacent to the notched section, and wherein the notched section spans a length at least equal to the distance between the first and last of the N conductive junctions.

24. The probe as defined in claim 17, wherein the N conductive junctions are positioned adjacent to an outward edge of the insulative sheet, wherein the shaft includes at least one longitudinal edge, and wherein the insulative sheet is supported by the supporting surface of the shaft such that the N conductive junctions are held in a cantilever fashion outboard from the longitudinal edge of the shaft.

25. The probe as defined in claim 24, wherein the longitudinal edge of the shaft is provided with a notch, wherein the printed circuit thermocouple array and the N conductive junctions thereon are held in a cantilever fashion from a longitudinal edge of the notch, and wherein the notched section spans a length at least equal to the distance between the first and last of the N conductive junctions.

26. The probe as defined in claim 17, wherein the printed circuit thermocouple array is attached to the shaft by an adhesive applied between the second surface of the insulative sheet and the supporting surface of the shaft.

27. The probe as defined in claim 17, wherein at least a portion of the printed circuit thermocouple array and shaft is surrounded by a tube.

28. The probe as defined in claim 27, wherein the tube is formed from a substantially rigid material.

29. The probe as defined in claim 27, wherein the tube is formed from an elastic material.

30. The probe as defined in claim 27, wherein the tube is formed from a heat shrinkable material and wherein the tube is shrunk over the portion of the printed circuit thermocouple array and shaft so as to be substantially conformal thereto.

31. The probe as defined in claim 27, wherein the tube includes an opening therein and wherein the opening is positioned adjacent to the N conductive junctions.

32. The probe as defined in claim 27, wherein the tube includes N openings, and wherein each of the N openings is positioned adjacent to one of the N conductive junctions.

33. The probe as defined in claim 17, wherein the shaft includes at least one longitudinal edge, wherein the insulative sheet is made from a rigid material and is provided with a tab section, wherein the N conductive junctions are positioned adjacent to an outward edge of the tab section, and wherein the insulative sheet is supported on the supporting surface of the shaft so that the N conductive junctions on the tab section are held in a cantilever fashion outboard from the longitudinal edge of the shaft.

34. A temperature gradient sensing probe for insertion into tissue undergoing a hyperthermic treatment process and for measuring a temperature gradient in said tissue, the temperature gradient sensing probe comprising:

a tube having an inside surface; and
a printed circuit thermocouple array applied to the inside surface of the tube, the printed circuit thermocouple array being formed by an electrically insulative sheet having:
 a first surface, a second surface and N electrically conductive junctions passing through the sheet from the first surface to the second surface, wherein N is an integer greater than one,
 N electrically conductive paths formed from a first conductive material applied to the first surface, wherein each of the N conductive paths formed from the first conductive material have a junction end electrically connected respectively to one of the N conductive junctions and a connector end for electrical connection to a signal transmission conduit, and
 N electrically conductive paths formed from a second conductive material, dissimilar to the first electrically conductive material, applied to the second surface, wherein each of the N conductive paths formed from the second electrically conductive material has a junction end electrically connected to one of the N conductive junctions and a connector end for electrical connection to a signal transmission conduit.

35. The temperature gradient sensing probe of claim 34, wherein the tube further includes an outside surface and an opening between the outside and inside surfaces; and wherein the printed circuit thermocouple array is conformingly applied to the inside surface of the tube so that the N conductive junctions are positioned adjacent to the opening between the inside and outside surfaces of the tube thereby permitting said junctions to be exposed to the tissue being measured.

36. A temperature gradient sensing probe for insertion into tissue undergoing a hyperthermic treatment process and for measuring a temperature gradient in said tissue, the temperature gradient sensing probe comprising:

a tube having an inside surface; and
a printed circuit thermocouple array applied to the inside surface of the tube, the printed circuit thermocouple array being formed by an electrically insulative sheet having:
 a first surface, a second surface and N electrically conductive junctions passing through the sheet from the first surface to the second surface, wherein N is an integer greater than one,
 N electrically conductive paths formed from a first conductive material applied to the first surface, wherein each of the N conductive paths formed from the first conductive material have a junction end electrically connected respectively to one of the N conductive junctions and a connector end for electrical connection to a signal transmission conduit, and
 a common electrically conductive path formed from a second conductive material which is dissimilar to the first conductive material, wherein the common electrically conductive path is connected to each of the N conductive junctions and wherein the common path has a connector end for electrical connection to a signal transmission conduit.

37. The temperature gradient sensing probe of claim 36, wherein the tube further includes an outside surface and an opening between the outside and inside surfaces; and wherein the printed circuit thermocouple array is conformingly applied to the inside surface of the tube so that the N conductive junctions are positioned adjacent to the opening between the inside and outside surfaces of the tube thereby permitting said junctions to be exposed to the tissue being measured.

* * * * *

UNITED STATES PATENT AND TRADEMARK OFFICE
CERTIFICATE OF CORRECTION

PATENT NO : 6,123,675
DATED : Sept. 26, 2000
INVENTOR(S): Kreizman et al.

It is certified that error appears in the above-identified patent and that said Letters Patent are hereby corrected as shown below:

Section [75]:

Under Inventors, please delete "Kenneth F. Defrietas" and insert --Kenneth F. DeFreitas--.

In column 3, line 20, please delete "FIGS. 5A" and insert --FIG. 5A--.

Signed and Sealed this

Twenty-second Day of May, 2001

Attest:

NICHOLAS P. GODICI

Attesting Officer     Acting Director of the United States Patent and Trademark Office